(12) United States Patent
Wakita

(10) Patent No.: US 10,891,862 B2
(45) Date of Patent: Jan. 12, 2021

(54) INFORMATION COMMUNICATION DEVICE AND POSITION MANAGEMENT SYSTEM

(71) Applicant: HONDA MOTOR CO., LTD., Tokyo (JP)

(72) Inventor: Kazuyoshi Wakita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/627,062

(22) PCT Filed: Jun. 29, 2017

(86) PCT No.: PCT/JP2017/024033
§ 371 (c)(1),
(2) Date: Dec. 27, 2019

(87) PCT Pub. No.: WO2019/003399
PCT Pub. Date: Jan. 3, 2019

(65) Prior Publication Data
US 2020/0184815 A1    Jun. 11, 2020

(51) Int. Cl.
*G08G 1/127* (2006.01)
*H04W 4/44* (2018.01)
(Continued)

(52) U.S. Cl.
CPC ............ *G08G 1/127* (2013.01); *G07C 5/008* (2013.01); *H04W 4/029* (2018.02); *H04W 4/44* (2018.02)

(58) Field of Classification Search
CPC combination set(s) only.
See application file for complete search history.

(56) References Cited

U.S. PATENT DOCUMENTS

2014/0350752 A1* 11/2014 Gelinske ............... G06F 13/42
                                                        701/2
2015/0193994 A1*  7/2015 McQuade ............ G07C 5/0825
                                                      701/29.3
(Continued)

FOREIGN PATENT DOCUMENTS

JP    09-145386 A    6/1997
JP    2015-032296 A  2/2015
JP    2017-083315 A  5/2017

OTHER PUBLICATIONS

PCT/ISA/210 from International Application PCT/JP2017/024033 with the English translation thereof.

*Primary Examiner* — Travis R Hunnings
(74) *Attorney, Agent, or Firm* — Carrier Blackman & Associates, P.C.; Joseph P. Carrier; William D. Blackman

(57) ABSTRACT

A vehicle-mounted information communication device includes a unit for acquiring information relating to the vehicle's current position; a position change amount calculation unit for acquiring information relating to an amount of change in the current position; and a transmission information generation unit for performing information communication with the outside of the vehicle. The transmission information generation unit generates reference information including the information relating to the vehicle's current position and transmits the reference information to the outside. At a timing different from that of the reference information, the transmission information generation unit generates progress information including the information relating to the amount of change in the current position and transmits the progress information to the outside.

11 Claims, 6 Drawing Sheets

(51) Int. Cl.
*H04W 4/029* (2018.01)
*G07C 5/00* (2006.01)

(56) References Cited

U.S. PATENT DOCUMENTS

| | | | | |
|---|---|---|---|---|
| 2017/0345232 A1* | 11/2017 | Hunt | ............ | G07C 5/008 |
| 2018/0357841 A1* | 12/2018 | McQuade | ............ | G07C 5/0808 |
| 2019/0279444 A1* | 9/2019 | McQuade | ............ | G07C 5/0825 |

* cited by examiner

INFORMATION COMMUNICATION DEVICE AND POSITION MANAGEMENT SYSTEM

TECHNICAL FIELD

The present invention relates to an information communication apparatus (information communication device) and a position management system that transmit information concerning a displacement body whose current position changes.

BACKGROUND ART

In so-called car-sharing, where a vehicle (displacement body) is shared by a plurality of members (users), it is preferable for the service provider to know the current position of the vehicle and perform management enabling each user to efficiently use the vehicle. Therefore, as an example, Japanese Laid-Open Patent Publication No. 2017-083315 discloses a system that transmits information concerning the current position from a plurality of vehicles and a portable terminal of a user and manages the usage situation of the vehicle with an information processing server (management apparatus).

When this type of position management system transmits information from a vehicle, it is possible that the current position of the vehicle (that is, the location where the user is, which is personal information) could be leaked to a third party through unauthorized access or the like. In order to restrict such a problem, there is an idea to apply sufficiently complex encryption to the transmitted information, but in such a case, the communication load on the vehicle side is increased and the processing load on the server that manages the current positions of a plurality of vehicles is increased. In other words, in the position management system, there is a desire to conceal information using a simpler method causing a lighter load.

SUMMARY OF INVENTION

The present invention has been devised in order to solve this type of problem, and has the object of providing an information communication apparatus and a position management system capable of protecting personal information, improving processing efficiency, and the like, by performing communication with high confidentiality in change information of the current position of the displacement body, with a simple configuration.

In order to achieve this object, the present invention is an information communication apparatus that is held by a displacement body whose current position changes according to passage of time, the information communication apparatus comprising a positional change amount acquiring section configured to acquire information concerning a change amount of the current position of the displacement body; and a transmission control section configured to transmit information to outside of the displacement body, wherein the transmission control section is configured to transmit, to the outside, change amount transmission information including information concerning the change amount of the current position.

According to the above, the information communication apparatus can conceal the content of the change of the current position of the displacement body, using a simple configuration in which the change amount information including the information concerning the change amount of the current position is transmitted. In other words, even if the change amount transmission information is leaked to a third party through unauthorized access, it is difficult to recognize the current position of the displacement body. Therefore, there is no need to apply complex encryption to the transmission information, and it is possible to restrict problems such as the processing load becoming heavy. As a result, personal information, improve efficiency, and the like are favorably protected.

The transmission control section may be preferably configured to generate the change amount transmission information as information that does not include information concerning the current position.

Since the communication information apparatus does not include the information concerning the current position in the change amount transmission information, even if a third party acquires the change amount transmission information, it is only possible to recognize the change amount of the current position, and it is possible to more reliably conceal the current position of the displacement body.

The transmission control section may be configured to transmit current position transmission information that includes information concerning the current position of the displacement body at a prescribed time to the outside, at a different timing than transmission of the change amount transmission information to the outside.

Since the information communication apparatus transmits the current position transmission information at a different timing than the transmission of the change amount transmission information, the reception side can obtain the current position of the displacement body at a prescribed time. In this way, it is possible to recognize the current position of the displacement body on the reception side, while concealing the current position of the displacement body during transmission of the change amount transmission information.

In addition to the above configuration, the transmission control section may be configured to transmit the current position transmission information to the outside, with a time at which driving of an information communication apparatus is started as the prescribed time.

By having the information communication apparatus transmit the current position at the drive start time, the reception side can accurately manage the current position of the displacement body based on the current position at the drive start time and the change amount of the current position.

The information concerning the change amount of the current position may be a movement direction and a movement distance of the displacement body in a prescribed interval.

The movement direction and the movement distance of the displacement body for each prescribed interval can be easily calculated by the sensors and measuring function of the displacement body. Accordingly, the information communication apparatus can easily generate and transmit the change amount transmission information.

The information communication apparatus may comprise a current position acquiring section configured to acquire information concerning the current position, wherein the positional change amount acquiring section may be configured to calculate the movement direction and the movement distance based on two current positions at different times, which are acquired by the current position acquiring section.

By having the information communication apparatus calculate the relative movement direction and movement distance of the new current position with respect to the old current position, the side that receives the change amount transmission information can accurately obtain the current position based on this movement direction and this movement distance.

Alternatively, the information communication apparatus may comprise a change amount sensor configured to detect the information concerning the change amount of the current position, wherein the positional change amount acquiring section may be configured to calculate the movement direction and the movement distance based on detection data SD detected by the change amount sensor.

In this way, the information communication apparatus can track the movement direction and movement distance of the displacement body using the detection data of the change amount sensor.

The displacement body may be an automobile in which the information communication apparatus is mounted.

The information communication apparatus can conceal the current position of the automobile, and has a high degree of versatility applicable in various services.

Furthermore, to achieve the above objective, the present invention is a position management system including the information communication apparatus described above, comprising a management apparatus configured to hold information concerning the current position of the displacement body at a prescribed time and receive the change amount transmission information from the information communication apparatus, wherein the management apparatus is configured to calculate the current position of the displacement body after the prescribed time, based on the information concerning the current position of the displacement body at the prescribed time held in the management apparatus and the change amount transmission information.

By having the management apparatus that holds the information concerning the current position of the displacement body receive the change amount transmission information, the position management system is capable of favorably calculating the current position of the displacement body with the management apparatus. Accordingly, the position management system is capable of protecting personal information, improving processing efficiency, and the like, while maintaining high confidentiality for the current position of the displacement body.

In this case, the management apparatus may be configured to receive the information concerning the current position of the displacement body at the prescribed time from the information communication apparatus.

The position management system is capable of more accurately recognizing the current position of the moving body by receiving the information concerning the current position of the displacement body from the information communication apparatus.

The displacement body may be usable in a shared manner by a plurality of users, and the management apparatus may be configured to manage current positions of a plurality of the displacement bodies.

By managing the current positions for a plurality of displacement bodies capable of being used in a shared manner by a plurality of users, such as in a car-sharing service, for example, the position management system can improve the usage efficiency and the like of the displacement bodies.

DESCRIPTION OF EMBODIMENTS

The following describes in detail examples of preferred embodiments of the information communication apparatus and the position management apparatus according to the present invention, while referencing the accompanying drawings.

Figure 1:
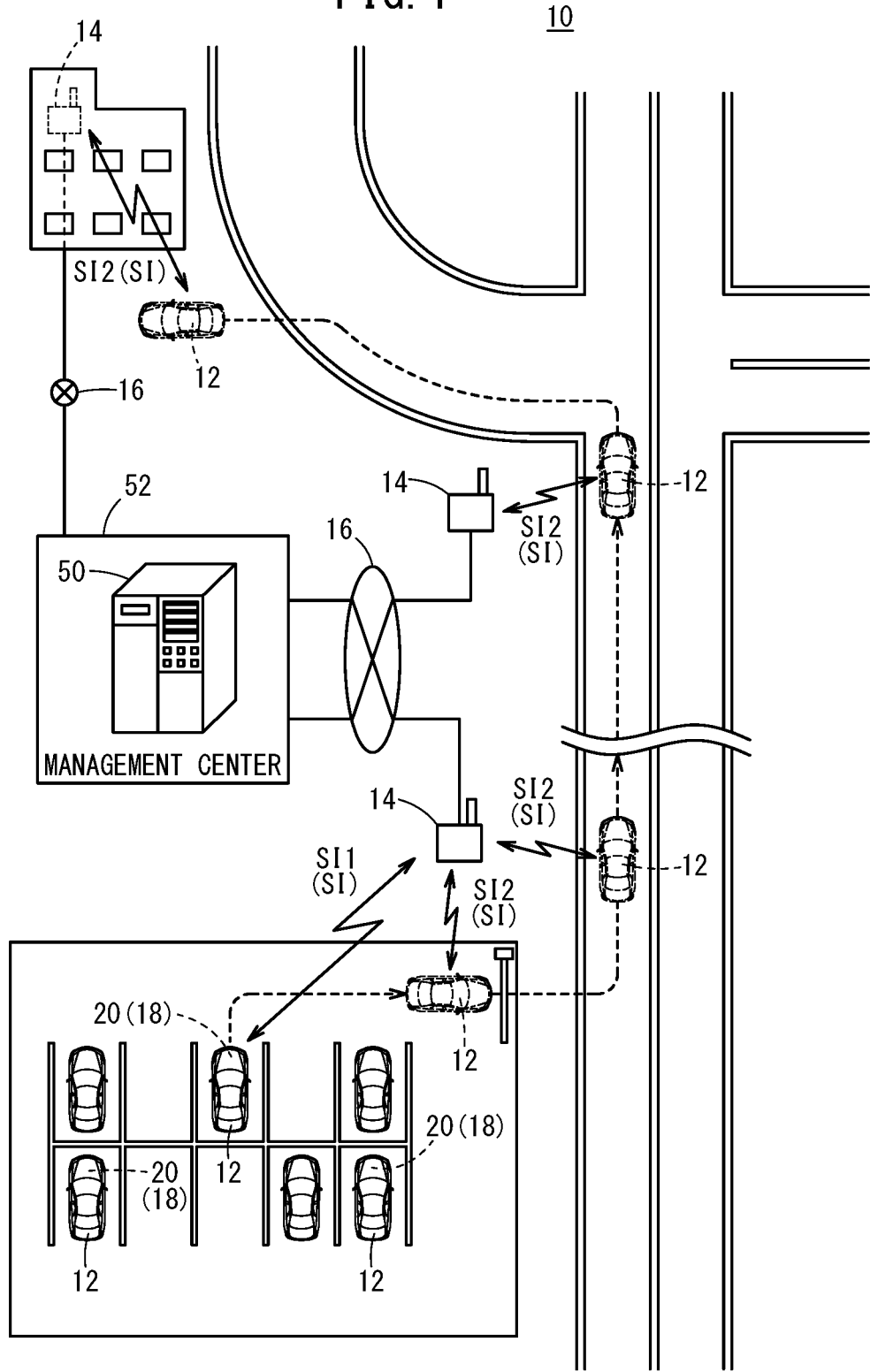
FIG. 1 schematically shows an overall configuration of a position management system according to one embodiment of the present invention.

As shown in FIG. 1, a position management system 10 according to one embodiment of the present invention is used for a car-sharing service and manages the current position of each of a plurality of vehicles 12 (displacement bodies) provided to members. In this position management system 10, the information communication apparatus 18 is mounted in the vehicle 12, and is capable of communicating with a base station 14 (access point), which is installed on a road, in a parking lot, or the like.

An example of the information communication apparatus 18 of the vehicle 12 includes an in-vehicle apparatus 20, which is a so-called navigation apparatus, that provides notification concerning the current position of the vehicle 12 and guides the vehicle 12 to a destination. Therefore, in the following, the information communication apparatus 18 is also referred to as the in-vehicle apparatus 20, and the configuration of the in-vehicle apparatus 20 will be described in detail together with the configuration of the vehicle 12. The types of vehicles 12 in which the information communication apparatuses are mounted are not particularly limited, and in addition to the automated four-wheel automobiles shown in FIG. 1, the information communication apparatus 18 can also be used in various vehicles 12 such as motorcycles and bicycles.

Furthermore, the position management system 10 includes a management server 50 (management apparatus) that is connected to a base station 14 via a network 16 and receives transmission information SI of the plurality of vehicles 12 (in-vehicle apparatuses 20). The management server 50 performs various types of data processing necessary for the service, by managing the current positions of the plurality of vehicles 12 involved in the car-sharing service.

In particular, the position management system 10 according to the present embodiment is configured to separately transmit information concerning a reference position P0 indicating the current position of the vehicle 12 at a prescribed time and information concerning a change amount Pα of the current position during travel, as the transmission information SI to be transmitted from the in-vehicle apparatus 20 to the management server 50. An initial position P01 at a travel start time of the vehicle 12 is provided as the "reference position P0". The management server 50 specifies the current position of each vehicle 12 by performing data processing of the received information concerning the reference position P0 and information concerning the change amount Pα of the current position. In this way, the transmission information SI does not include the current position of the vehicle 12 during travel, and therefore has increased confidentiality. Accordingly, even if the transmission information SI were to be read by a third party through unauthorized access or the like, it would be difficult to identify the current position of the vehicle 12. The following is a detailed description of the configuration of the in-vehicle apparatus 20 and the position management system 10.

Figure 2:
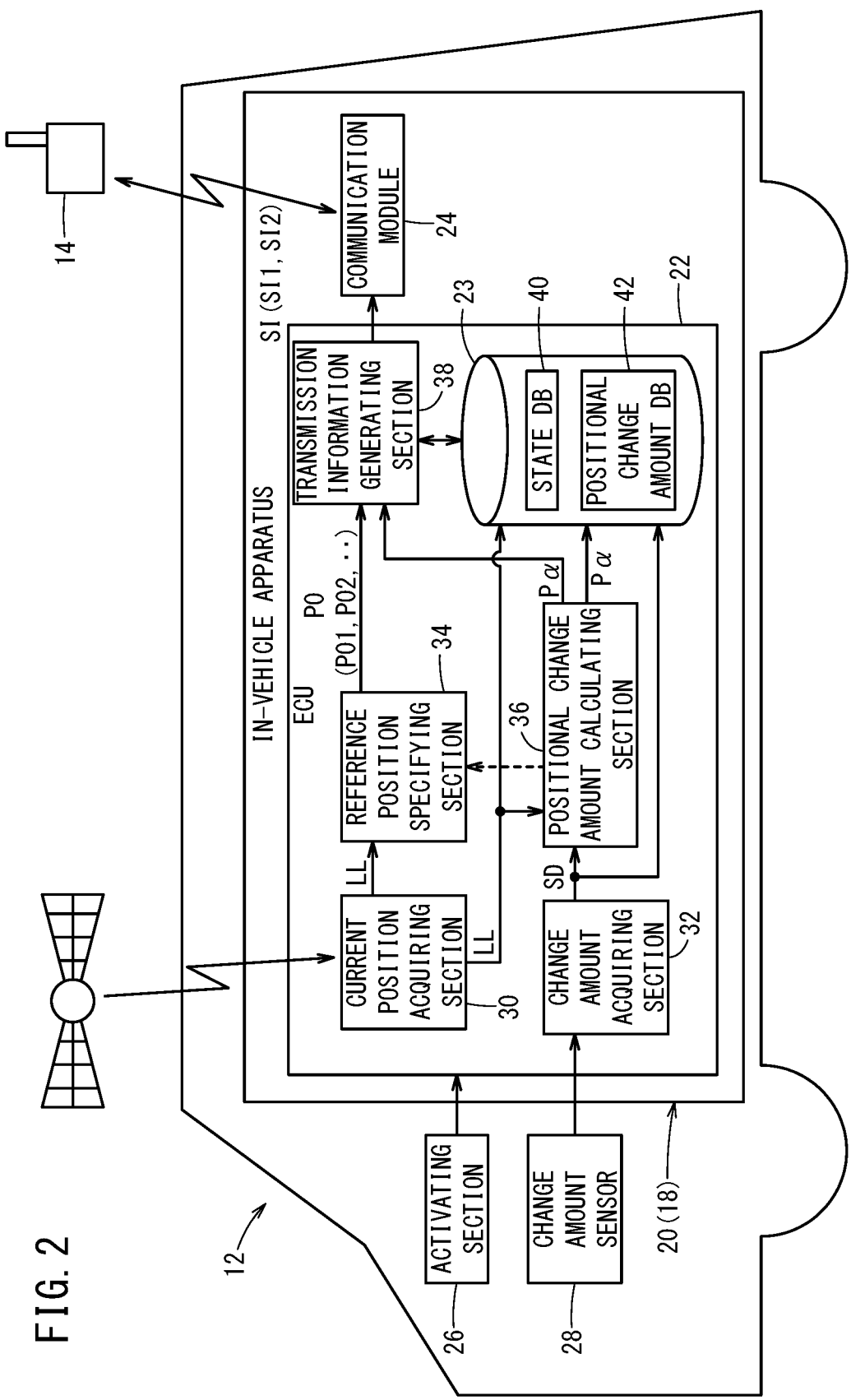
FIG. 2 is a function block diagram of a vehicle and an in-vehicle apparatus of the position management system.

As shown in FIG. 2, the in-vehicle apparatus 20 includes an ECU (Electronic Control Unit) 22 and a communication module 24 that is connected to the ECU 22 and performs wireless communication with the external base station 14. Furthermore, an activating section 26 and a change amount sensor 28 provided to the vehicle 12 are connected to the in-vehicle apparatus 20 in a communicable manner, via in-vehicle communication lines (not shown in the drawings).

The activating section 26 of the vehicle 12 is a mechanical section that switches between a driving state and a driving-stopped state of the vehicle 12, based on a manipulation by a user riding in the vehicle 12. The in-vehicle apparatus 20 also starts operating based on an activation signal of the activating section 26. As an example, an ignition switch, a power source switch, or the like usually provided to the vehicle 12 corresponds to this type of activating section 26. The in-vehicle apparatus 20 may operate based on a manipulation (e.g., turning ON a power source switch for the in-vehicle apparatus 20) other than the manipulation of the activating section 26 by the user.

The change amount sensor 28 is a detection device for detecting state information of the vehicle 12 when the vehicle 12 is travelling. The change amount sensor 28 can be configured as just one type of detection device, but is preferably configured as a combination of a plurality of types of detection devices.

Examples of the change amount sensor 28 include a vehicle speed sensor that detects the vehicle speed, an acceleration sensor (including a gyro sensor) that detects acceleration, a yaw rate sensor that detects angular velocity around a perpendicular axis, an orientation sensor that detects the orientation of the vehicle 12, a gradient sensor that detects the gradient of the vehicle 12, and the like. Alternatively, the change amount sensor 28 may include sensors that detect manipulation amounts (accelerator depression (opening) amount, steering wheel manipulation (steering) amount, brake depression amount, shift position, and the like) of an accelerator, a steering wheel, a brake, a shift lever, and the like for a user to manipulate the vehicle 12.

The ECU 22 of the in-vehicle apparatus 20 includes a memory 23 along with an input/output interface, a processor, and a timer (not shown in the drawings), and is also connected to an input apparatus and an output apparatus (not shown in the drawings) via the input/output interface. Examples of the input apparatus include a manipulation button, a microphone, and the like, and the input apparatus may enable the setting of a destination by the user, who is an occupant of the vehicle 12, for example. Examples of the output apparatus include a display, a speaker, and the like, and the output apparatus outputs a variety of information to the user. The input apparatus and the output apparatus may be formed as an integrated apparatus, such as a touch screen.

The processor of the ECU 22 outputs navigation information to the user, by executing programs (not shown in the drawings) stored in the memory 23. For the navigation of the vehicle 12, the ECU 22 receives a satellite signal from a GNSS (Global Navigation Satellite System) and measures the current position of the vehicle 12. Furthermore, the ECU 22 superimposes the measured current position of the vehicle 12 onto the stored map information and displays the resulting information in the display, and also displays a route to the destination input by the user and outputs audio guidance from the speaker to perform navigation. Since this type of navigation function is widely known, a detailed description thereof is omitted.

Then, according to the executed programs, the ECU 22 constructs the function blocks shown in FIG. 2 and generates the transmission information SI for transmitting the data of the vehicle 12 to the management server 50. As described above, the transmission information SI can be divided into reference information SU (current position transmission information) that includes the information concerning the reference position P0 and progress information SI2 (change amount transmission information) that includes the information concerning the change amount Pα of the current position.

Specifically, a current position acquiring section 30, a change amount acquiring section 32, a reference position specifying section 34, a positional change amount calculating section 36 (positional change amount acquiring section), and a transmission information generating section 38 (transmission control section) are constructed inside the ECU 22. Furthermore, a state database 40 storing the state of the vehicle 12 (measurement information LL and detection data SD) and a positional change amount database 42 in which the change amount Pα of the current position is continually registered are stored in the memory 23 of the ECU 22.

The current position acquiring section 30 is a function section that measures the current position of the vehicle 12, described with the navigation function, and performs this measurement at a preset timing. For example, the current position acquiring section 30 operates automatically immediately after activation of the in-vehicle apparatus 20, and calculates the current position of the vehicle 12 with information concerning the latitude and longitude. Furthermore, when the vehicle 12 is in the driven state, the current position acquiring section 30 periodically performs measurement and continually specifies the current position (latitude and longitude) of the vehicle 12. The current position acquiring section 30 stores the specified measurement information LL in the state database 40, and also outputs this information to the reference position specifying section 34 and the positional change amount calculating section 36.

The current position acquiring section 30 is not limited to measurement based on the GNSS satellite signal, and may identify the current position of the vehicle 12 using a variety of methods. For example, the current position acquiring section 30 may be configured to, when the vehicle 12 is stopped in a specified parking lot, receive a precise current position from a wireless base station (position information providing service) (not shown in the drawing) outside the vehicle (on land), via the communication module 24. Alternatively, the current position acquiring section 30 may be configured to receive the current position from a portable terminal of the user, via a variety of communication means (short-range wireless communication module or the like).

On the other hand, the change amount acquiring section 32 receives a detection signal from the change amount sensor 28 of the vehicle 12 every set interval (e.g. several milliseconds). The change amount acquiring section 32 then converts from the detection signal to detection data SD that can be used in the data processing of the positional change amount calculating section 36, and outputs the detection data SD to the positional change amount calculating section 36. Furthermore, the change amount acquiring section 32 consecutively stores the acquired detection data SD in the state database 40 of the memory 23.

The reference position specifying section 34 is a function section that obtains the reference position P0 of the reference information SI1, and in this way, the current position in a case where the initial position P01 of the vehicle 12 at the travel start time is the reference position P0, for example, is specified. As an example, the reference position specifying section 34 receives the measurement information LL first measured by the current position acquiring section 30 when the in-vehicle apparatus 20 was activated, recognizes this as the reference position P0 (initial position P01), and outputs this reference position P0 to the transmission information generating section 38. The reference position specifying section 34 stores in advance the current position at the stage where the driving of the vehicle 12 was stopped, and may immediately transmit this stored current position to the management server 50 as the reference position P0 at the next travel start time. Furthermore, the reference position specifying section 34 may be configured to continuously receive the change amount Pα (movement direction and movement distance) of the current position from the positional change amount calculating section 36, calculate the current position based on this information, and store the calculated current position (see the dashed line in FIG. 2).

The positional change amount calculating section 36 calculates the change amount Pα of the current position of the vehicle 12, based on the measurement information LL of the current position acquiring section 30 or the detection data SD of the change amount acquiring section 32. The "amount of change of the current position" is vector information indicating relative positional change between different times. In other words, the current position (relative position) at a second time relative to the current position at a first time can be expressed by numerical values indicating in which direction the vehicle 12 progressed and how much distance the vehicle 12 moved. Therefore, the positional change amount calculating section 36 continually calculates, at every prescribed interval (or according to the state of the vehicle 12, or as needed), the movement direction and the movement distance of the vehicle 12.

In the calculation of the change amount Pα of the current position, calculation methods (a) and (b) shown below can be adopted, for example.

(a) The movement direction and movement distance of the vehicle 12 are calculated discretely, based on the latitude and longitude of the measurement information LL.

(b) The movement direction and movement distance of the vehicle 12 are calculated continuously, based on the detection data SD.

Figure 3:
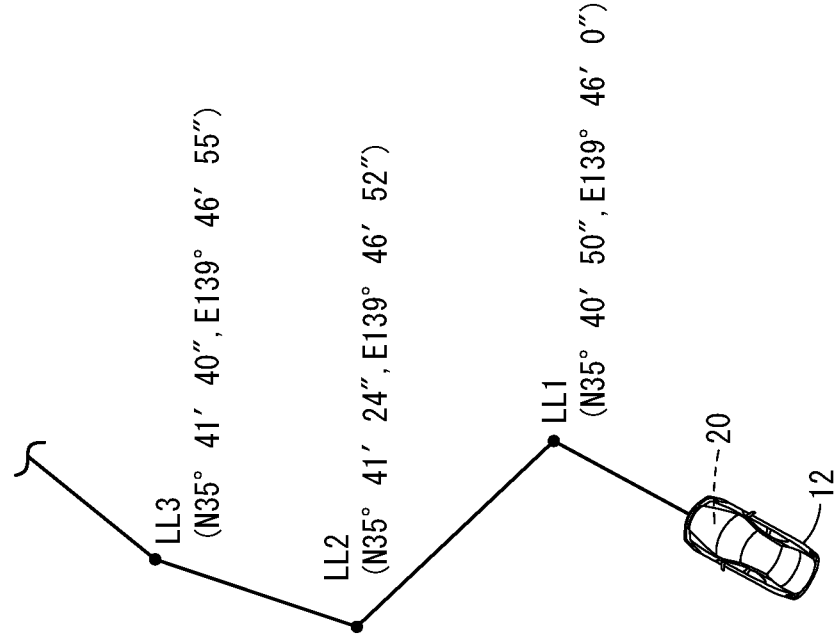
FIG. 3A is a planar view of an example of positional change of the vehicle.
FIG. 3B is a descriptive diagram showing a flow of data for calculating a change amount of a current position based on measurement information.

As shown in FIGS. 3A and 3B, calculation method (a) uses the change of the current position (latitude and longitude) that accompanies the passage of time, obtained from the current position acquiring section 30. In other words, in the configuration where the measurement information LL is acquired by the current position acquiring section 30 at each prescribed time, the current position of the vehicle 12 can be grasped as a change of coordinates in a virtual space (navigation). Therefore, the positional change amount calculating section 36 (or the current position acquiring section 30) links the measurement information LL with the time, and sequentially stores this linked information in the state database 40.

The positional change amount calculating section 36 then calculates the movement direction and movement distance in a prescribed interval, from previous measurement information acquired at a previous time (first time), the current measurement information acquired at a current time (second time), and the times linked to these pieces of information. The movement direction can be expressed as the slope of the current coordinates relative to the previous coordinates, and the movement directions for the pieces of measurement information LL1 to LL2 and LL2 to LL3 in FIG. 3A, for example, are calculated as +20.14°, −65.87°, and the like. The positive/negative sign of the movement direction indicates the difference between clockwise and counter-clockwise. Furthermore, the movement distance occurs in the length between the previous coordinates and the current coordinates, and therefore the movement distances for the pieces of measurement information LL1 to LL2 and LL2 to LL3 in FIG. 3A, for example, are calculated as 105.33 m, 99.01 m, and the like.

The positional change amount calculating section 36 links the movement directions and movement distances calculated in the prescribed interval (between the first time and the second time), and stores the linked information in the positional change amount database 42. In this way, even though the movement direction and movement distance are calculated based on the latitude and longitude at every discrete time, significant errors do not occur in the current position calculated through reverse calculation. In other words, if the current position P0 of the vehicle 12 is known, it is possible to track the current position by following the movement direction and movement distance for each predetermined interval.

Figure 4:
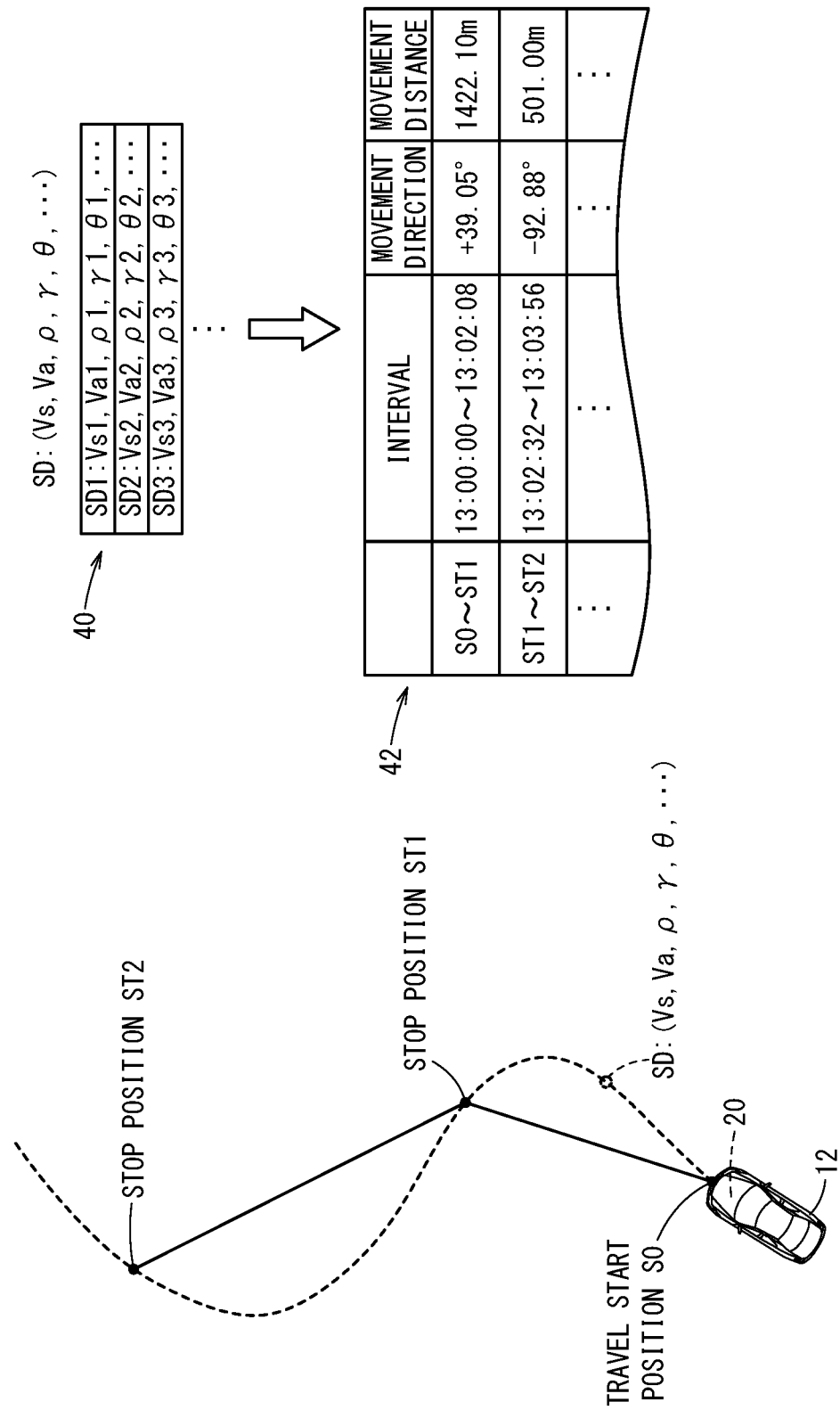
FIG. 4A is a planar view of an example of positional change of the vehicle.
FIG. 4B is a descriptive diagram showing a flow of data for calculating a change amount of a current position based on detection data.

As shown in FIGS. 4A and 4B, in calculation method (b), the change amount Pα of the current position is calculated by continuously monitoring the detection data SD of the change amount sensor 28 detected while the vehicle 12 travels. In other words, it is possible for the in-vehicle apparatus 20 to continuously track the route (current position) of the vehicle 12 by continuously acquiring the detection data SD (vehicle speed Vs, acceleration Va, yaw rate ρ of the vehicle 12, gradient γ, direction θ of the vehicle 12, and the like) with the change amount acquiring section 32.

Accordingly, as an example, the positional change amount calculating section 36 continues to acquire the detection data SD at every short interval, such as several milliseconds, from when the movement starts and stores this data in the state database 40, and continues to derive the movement direction and movement distance from the detection data SD using a prescribed arithmetic expression. The movement direction and the movement distance are stored in the position change amount database 42. The derivation of the movement direction and movement distance may be temporarily stopped based on the detection of an action such as the travel of the vehicle 12 stopping, and a conversion to the current position, reverification of the current position, or the like may be performed.

As an example, when the in-vehicle apparatus 20 calculates the movement direction to be +39.05° and the movement distance to be 1422.10 m for a stop position ST1 relative to the travel start position S0 (initial position P01), the in-vehicle apparatus 20 can calculate the coordinates (latitude and longitude) of the stop position ST1 and perform a reset. Similarly, when the in-vehicle apparatus 20 calculates the movement direction to be −92.88° and the movement distance to be 501.00 m for a stop position ST2 relative to the stop position ST1, the in-vehicle apparatus 20 can calculate the coordinates (latitude and longitude) of the stop position ST2 and perform a reset. Furthermore, by storing the movement direction and movement distance at the stage when the vehicle 12 temporarily stopped in addition to the latitude and the longitude in the positional change amount database 42, it is possible to easily obtain the movement direction and movement distance when the transmission information generating section 38 generates the transmission information SI.

The calculation of the change amount Pα of the current position can obviously be acquired using various methods, and is not limited to the calculation method described above. For example, the positional change amount calculating section 36 may adopt a means that performs both of the calculation methods (a) and (b), calculates the average of two change amounts Pα, corrects one of the change amounts Pα, and the like. In the following description, calculation method (a) is used as a representative example for describing the process used to calculate the change amount Pα of the current position.

Returning to FIG. 2, the transmission information generating section 38 has a function to suitably generate the transmission information SI according to the transmission timing, and transmit the generated transmission information SI to the management server 50. As described above, the present embodiment is configured such that the reference information SI1 including the reference position P0 and the progress information SI2 including the change amount Pα of the current position are transmitted at separate transmission timings. The transmission information generating section 38 may include an encryption generating section (not shown in the drawings) and, after the generation of the transmission information SI, may encrypt the transmission information SI and transmit the encrypted information.

For example, upon receiving the reference position P0 (initial position P01) from the reference position specifying section 34 when the vehicle 12 is activated (travel start time), the transmission information generating section 38 generates the reference information SI1 including the reference position P0 along with an identification code of the vehicle 12 (in-vehicle apparatus 20). The communication module 24 of the in-vehicle apparatus 20 is then controlled to wirelessly transmit the reference information SI1 to the external base station 14.

Furthermore, as an example, the transmission information generating section 38 reads the positional change amount database 42 from the memory 23 at a suitable timing or regularly, while the vehicle 12 is travelling. The transmission information generating section 38 then generates the progress information SI2 by sequentially extracting, at each prescribed interval, each piece of data, such as the movement direction and the movement distance, linked to the prescribed interval stored in the positional change amount database 42, and then further including the identification code. This progress information SI2 is information indicating the change amount Pα of the current position, and does not include the reference position P0. Furthermore, when the change amount Pα of the current position was transmitted previously, the transmission information generating section 38 generated the progress information SI2 by extracting the information (movement direction and movement distance) of the subsequent prescribed interval in which the transmitted data was omitted.

The transmission information generating section 38 may be configured to regularly transmit the progress information SI2 while the vehicle 12 is travelling, or may be configured to transmit the progress information SI2 when the vehicle 12 is stopped and not to transmit the progress information SI2 while the vehicle 12 is travelling. If the transmission information generating section 38 is configured to transmit the progress information SI2 while the vehicle 12 is travelling, the management server 50 can track the current position of the vehicle 12 at short intervals. On the other hand, if the transmission information generating section 38 is configured to transmit the progress information SI2 when the vehicle 12 is stopped, it is possible to restrict transmission errors and increase the accuracy of the information.

The transmission information generating section 38 may be configured to transmit the current positions (intermediate positions P02, P03, etc.) at certain times during travel, in addition to transmitting the initial position P01 at the travel start time of the vehicle 12 as the reference position P0 included in the reference information SI1. For example, when the vehicle 12 has travelled for a prescribed time period after the transmission of the initial position P01, the transmission information generating section 38 generates and transmits the reference information SI1 including the intermediate position P02 as the reference position P0. In this way, the management server 50 can perform adjustments, corrections, and the like on the calculated current position of the vehicle 12. The transmission timing of the reference position P0 (intermediate positions P02, P03, etc.) is not particularly limited, and as an example, the transmission may be performed by making a request for the current position when the management server 50 has detected a large discrepancy from road coordinates while calculating the current position of the vehicle 12.

In an opposite manner, the transmission information generating section 38 may be configured to transmit only the change amount Pα of the current position, and not transmit the reference position P0, any time after the transmission of the initial position P01 at the travel start time, while the vehicle 12 is being used. For example, the transmission information generating section 38 may be configured such that while the vehicle 12 is being used, after the driving of the vehicle 12 is stopped (the activating section 26 is turned OFF), the reference position P0 is not transmitted when the driving is again started (the activating section 26 is turned ON). In this way, it is possible to more strongly conceal the current position of the vehicle 12. Furthermore, in this case as well, the management server 50 side can recognize the current position of the vehicle 12 based on the initial position P01 and the change amount Pα of the current position.

Yet further, the transmission information generating section 38 may be configured not to transmit the current position of the vehicle 12 as the reference position P0 but to transmit the initial position P01 at the travel start time, when the vehicle 12 resumes being driven after the driving has stopped. In this case as well, the concealment of the information is sufficiently strong, and the management server 50 can specify the vehicle 12 with the retransmitted initial position P01 and recalculate the current position from the accumulate change amount Pα of the current position.

The communication module 24 of the in-vehicle apparatus 20 can use a widely known wireless chip or the like that has a function to implement wireless communication. As an example, the communication module 24 forms a wireless LAN environment compliant with the IEEE802.11 standard (so-called Wi-Fi). The wireless communication method may adopt a standard such as IEEE802.15 or IEEE802.16 (so-called WiMAX).

Figure 5:
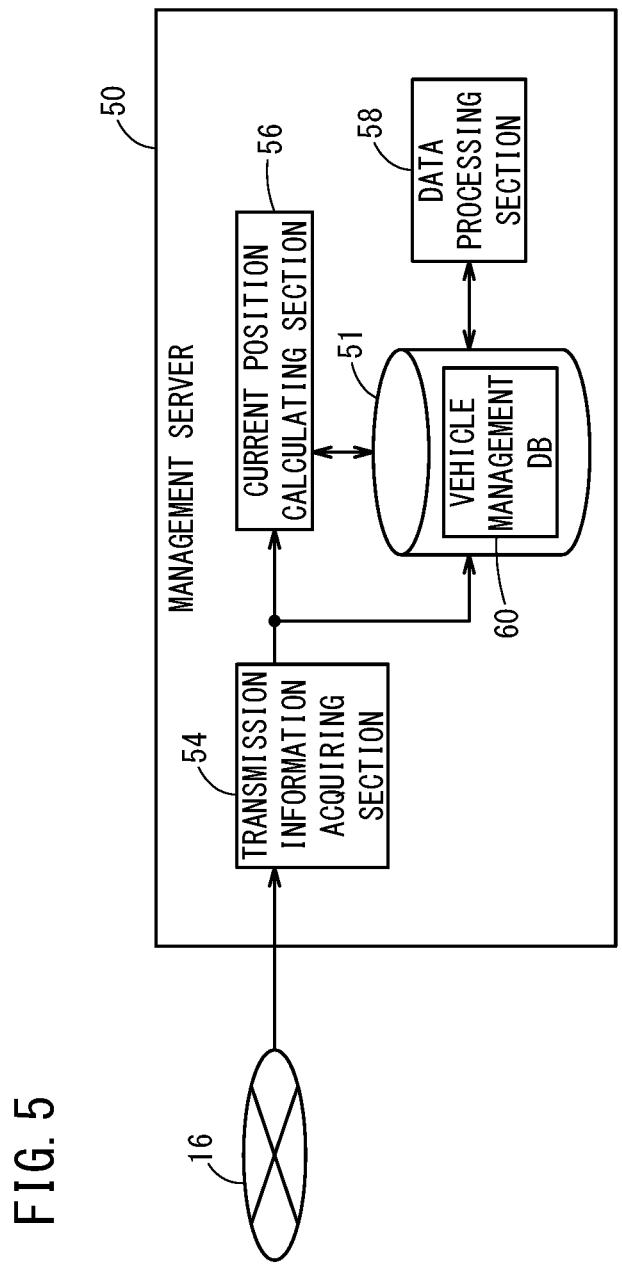
FIG. 5 is a function block diagram of a management server of the position management system.

On the other hand, the management server 50 of the position management system 10 is installed in a management center 52 and connected in a communicable manner to the network 16, as shown in FIG. 5, by a communication means such as a communication line and a communication terminal. The current position of each of a plurality of vehicles 12 of the car-sharing service are managed by the management server 50. The management server 50 can use a widely known computer including an input/output interface, a processor, a memory, and the like. Furthermore, an input apparatus and an output apparatus (not shown in the drawings) are connected to the management server 50, and a worker at the management center 52 performs confirmation, processing, and the like of the stored information.

A transmission information acquiring section 54, a current position calculating section 56, and a data processing section 58 are provided inside the management server 50. A memory 51 of the management server 50 is provided with a vehicle management database 60 that stores the states of the plurality of vehicles 12. The identification code, current position, initial position (position before the driving starts), reservation date and time, usage start date and time, usage end date and time, fuel amount, and the like are stored in the vehicle management database 60 as the data of the state of each vehicle 12.

The transmission information acquiring section 54 receives the transmission information SI (reference information SI1 and progress information SI2) from the plurality of vehicles 12, and performs decryption, analysis of the transmission information SI, and the like. Then, in the case of the reference information SI1, the reference position P0 is stored in the vehicle management database 60. Furthermore, in the case of the progress information SI2, the change amount Pα (movement direction and movement distance for each prescribed interval) of the current position is output to the current position calculating section 56.

The current position calculating section 56 calculates the current position of each vehicle 12 based on the reference position P0 stored in the vehicle management database 60 and the change amount Pα of the current position. Furthermore, in a case where the current position is calculated while the vehicle 12 is travelling, the current position calculating section 56 calculates the subsequent current position based on the change amount Pα of the subsequent (new) current position from the above current position. In this way, the management server 50 can accurately determine the current position of each vehicle 12. The calculated current position of the vehicle 12 is stored in the vehicle management database 60, for each vehicle 12.

The data processing section 58 performs various types of data processing based on the current positions of the vehicles 12, according to a manipulation of a worker (or automatically). For example, the data processing section 58 monitors the vehicle management database 60 and, upon determining that the current position of a certain vehicle 12 is far from a return location and it would be difficult for this vehicle 12 to return by the usage end date and time, provides notification prompting the return to this vehicle 12 (in-vehicle apparatus 20), deploys another vehicle 12, or the like.

If the management server 50 holds the information concerning the current positions of the vehicles 12, the position management system 10 does not necessarily have to receive the reference information SI1 including the reference position P0, and can be configured to receive only the progress information SI2 including the change amount Pα of the current position. For example, a parking position before usage of a vehicle 12 starts is set by the car-sharing service. Therefore, the management server 50 holds the parking position of the vehicle 12 as the reference position P0, and even when only the progress information SI2 is received, it is still possible to recognize the current position of the vehicle 12 from the change amount Pα of the current position and the parking position that serves as the reference position P0.

The position management system 10 and the in-vehicle apparatus 20 according to the present embodiment are basically configured in the manner described above, and the following describes the process flows and effects thereof.

The position management system 10 according to the present embodiment manages the current positions of the plurality of vehicles 12 with the management server 50, in the car-sharing service. The in-vehicle apparatus 20 mounted in each vehicle 12 first transmits the reference information SI1 including the reference position P0, as the transmission information SI concerning the current position of a vehicle 12. After this, the in-vehicle apparatus 20 transmits the progress information SI2 for transmitting the change amount Pα of the current position, at each prescribed timing.

Figure 6B:
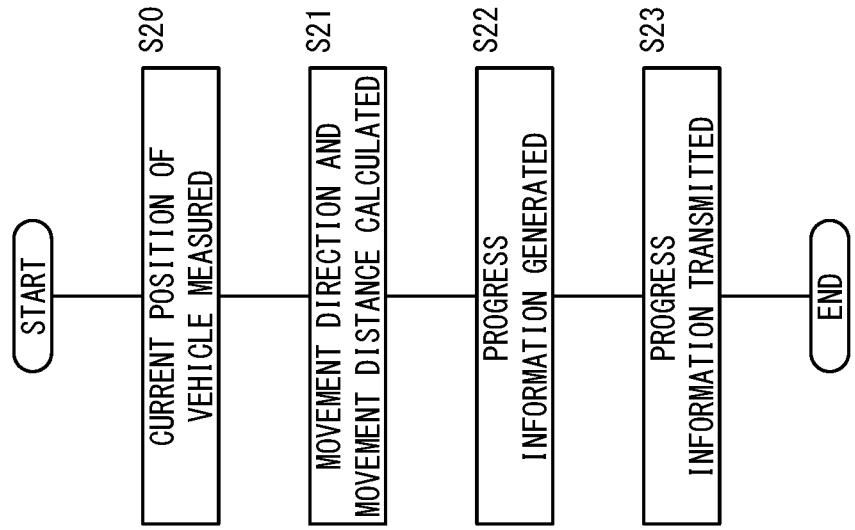
FIG. 6B is a flow chart showing a process flow for generating and transmitting progress information.
Figure 6A:
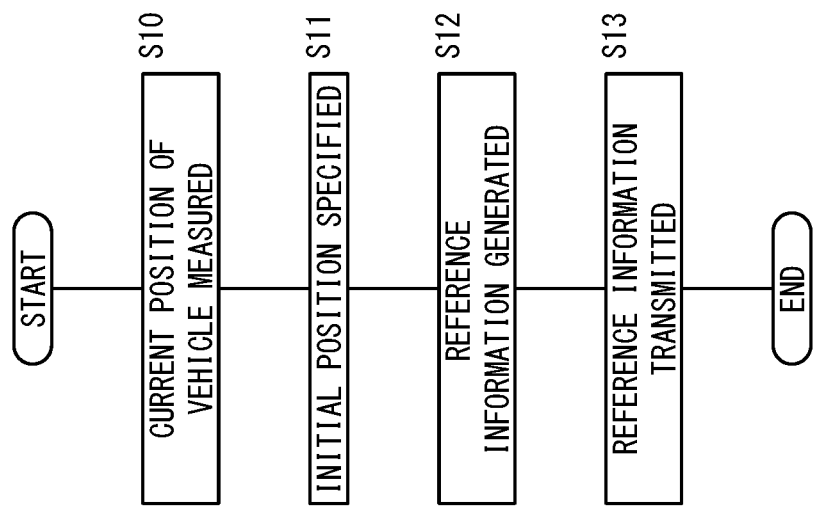
FIG. 6A is a flow chart showing a process flow for generating and transmitting reference information.

Specifically, for the transmission of the reference information SI1, the in-vehicle apparatus 20 performs the process flow shown in FIG. 6A. In this case, first, in accordance with the activation manipulation of the activating section 26 being performed by the user of the vehicle 12, the current position acquiring section 30 measures the current position of the vehicle 12 (step S10).

Then the reference position specifying section 34 receives the initial measurement information LL from the current position acquiring section 30, specifies this measurement information LL as the initial position P01 (reference position P0), and outputs this initial position P01 to the transmission information generating section 38 (step S11).

Upon receiving the initial position P01, the transmission information generating section 38 generates the reference information SI1 including the identification code, the time of the measurement (travel start time of the vehicle 12), the initial position P01, and the like (step S12). The transmission information generating section 38 then controls the communication module 24 to transmit the generated reference information SI1 to the management server 50 (step S13).

Then, while the vehicle 12 is being driven (including both the travelling state and the travelling-stopped state) after the transmission of the reference information SI1, the in-vehicle apparatus 20 performs the process flow shown in FIG. 6B. In other words, the in-vehicle apparatus 20 generates the measurement information LL by regularly measuring the current position of the vehicle 12 with the current position acquiring section 30, and outputs the measurement information LL to the positional change amount calculating section 36 (step S20).

The positional change amount calculating section 36 calculates the movement direction and movement distance for a given interval, based on the received current position and measurement time and the previous current position and time stored in the state database 40 (step S21). The calculated movement direction and movement distance (change amount Pα of the current position) are stored in the positional change amount database 42 of the memory 23.

Furthermore, the transmission information generating section 38 references the positional change amount database 42 (or receives the change amount Pα of the current position from the positional change amount calculating section 36) and generates the progress information SI2 including the change amount Pα (movement direction and movement distance) of the current position (step S22). This progress information SI2 includes the identification code and the information of the prescribed interval linked to the change amount Pα of the current position.

The transmission information generating section 38 then controls the communication module 24 to transmit the generated progress information SI2 to the management server 50 (step S23).

On the other hand, the management server 50 of the position management system 10 receives the reference information SI1 once from the in-vehicle apparatus 20, and after this discretely receives the progress information SI2 continually. In response to receiving the progress information SI2, the management server 50 calculates the current position of the vehicle 12 using the reference position P0 and the change amount Pα of the current position thereof, and continually accumulates or updates the current position of the vehicle 12 in the vehicle management database 60. In this way, the management server 50 can favorably manage the current positions of the plurality of vehicles 12.

In the manner described above, the in-vehicle apparatus 20 (information communication apparatus 18) and the position management system 10 according to the present embodiment can conceal the content of the change of the current position of the vehicle 12, using a simple configuration in which the progress information SI2 including the information concerning the change amount Pα of the current position is transmitted. In other words, even if the progress information SI2 is leaked to a third party through unauthorized access, it is difficult to recognize the current position of the vehicle 12. Therefore, there is no need to apply complex encryption to the transmission information SI, and it is possible to restrict problems such as the processing load becoming heavy. As a result, the position management system 10 can favorably protect personal information, improve efficiency, and the like.

This position management system 10 realizes a high degree of confidentiality for the current positions of automobiles, and therefore has a high degree of versatility applicable in various services. For example, the position management system 10 and the information communication apparatus 18 are beneficial for a system that manages vehicles 12 (rental cars, police vehicles, buses, taxis, business cars, and the like) owned by car rental services, public services, public transportation, companies, and the like.

In particular, since the in-vehicle apparatus 20 does not include the information concerning the current position in the progress information SI2, even if a third party acquires the progress information SI2, it is only possible to recognize the change amount Pα of the current position. Furthermore, by transmitting the reference information SI1 at a different timing than the transmission of the progress information SI2 by the in-vehicle apparatus 20, the management server 50 can obtain the reference position P0 (initial position P01) of the vehicle 12 at a prescribed time, in addition to the change amount Pα of the current position. In other words, the in-vehicle apparatus 20 can more reliably conceal the current position of the vehicle 12, and the management server 50 makes it possible to favorably recognize the current position of the vehicle 12. The in-vehicle apparatus 20 may be configured to, when the vehicle 12 has been travelling for a long time, for example, include the current position of the vehicle 12 in the progress information SI2 and transmit this information while the vehicle 12 is travelling. In this way, the management server 50 can reset the process for calculating the current position from the reference position P0 and the change amount Pα that is based on the current position. Then, it is possible to accurately calculate the current position again, based on the transmitted current position (measurement information LL of the intermediate position P02) and the change amount Pα of the current position after this.

Furthermore, the change amount Pα of the current position can be calculated easily by the change amount sensor 28 and the measuring function, since the change amount Pα is vector information including the movement direction and movement distance of the vehicle 12 for each prescribed interval. Accordingly, the in-vehicle apparatus 20 can easily generate and transmit the progress information SI2.

In this case, the in-vehicle apparatus 20 can accurately obtain the new current position by calculating the relative movement direction and movement distance of the new current position with respect to the old current position. The management server 50 side can then accurately reverse-calculate the current position based on this movement direction and this movement distance. Furthermore, the position management system 10 applied to a car-sharing service is capable of favorably managing the current position of each of a plurality of vehicles 12 that can be used in a shared manner by a plurality of users. In this way, it is possible to improve the usage efficiency of the vehicles 12.

The information communication apparatus 18 and the position management system 10 according to the present embodiment are not limited to the embodiment described above, and can be altered and adapted in various ways.

For example, the information communication apparatus 18 is not limited to the in-vehicle apparatus 20 that has the navigation function described above. As an example, the information communication apparatus 18 may be a communication device that simply has only a communication function. This communication device can generate and transmit the transmission information SI in the same manner as in the embodiment described above, by being connected in a communicable manner to a navigation function section or the change amount sensor 28 of the vehicle 12. Another information communication apparatus 18 is capable of also being added to the ECU 22 or the like that controls the vehicle 12.

The position management system 10 according to the present invention is not limited to a service for managing the current positions of vehicles 12, and can be configured as a system for managing the positions of other moving bodies, people, animals, or the like. Examples of moving bodies include unmanned moving bodies such as drones, boats/ships, airplanes, and the like, in which case it is possible to manage the position of each moving body by suitably mounting the information communication apparatus 18 capable of detecting the change amount Pα of the current position in the moving body.

Furthermore, in a case where the position management system 10 is used for people or animals, it is only necessary to configure the information communication apparatus 18 according to the present invention by using a portable terminal (including a smartphone), sensor device terminal, or the like that has a communication function. In this way, it is possible to track the current position of a person or animal.

Furthermore, the position management system 10 is not limited to a configuration for communicating information from the information communication apparatus 18 to the management server 50, and may be configured to communicate information from one information communication apparatus to another information communication apparatus. For example, a parent can cause a child to hold a portable terminal to know the position information of the child, and the position management system 10 can be configured to transmit the change amount Pα of the current position of the child to a portable terminal or computer of the parent.

The present invention is not limited to the above-described embodiment modifications, and adaptations, and various alterations can be adopted in accordance with the essence of the present invention.

The invention claimed is:

1. An information communication apparatus that is held by a displacement body whose current position changes according to passage of time, the information communication apparatus comprising:
    a positional change amount acquiring section configured to acquire information concerning a change amount of the current position of the displacement body; and
    a transmission control section configured to transmit information to outside of the displacement body,
    wherein the transmission control section is configured to transmit current position transmission information that includes information concerning the current position of the displacement body at a prescribed time to the outside,
    the transmission control section is configured to generate change amount transmission information as information that includes information concerning the change amount of the current position but does not include information concerning the current position, and
    the transmission control section is configured to transmit the change amount transmission information to the outside, at a different timing than transmission of the current position transmission information to the outside.

2. The information communication apparatus according to claim 1, wherein the transmission control section is configured to transmit only the change amount transmission information after the transmission of the current position transmission information.

3. The information communication apparatus according to claim 1, wherein the transmission control section is configured to transmit the current position transmission information to the outside, with a time at which driving of the information communication apparatus is started as the prescribed time,
    the transmission control section does not transmit the change amount transmission information while the displacement body is travelling, but transmits the change amount transmission information when the displacement body is stopped.

4. The information communication apparatus according to claim 1, wherein the transmission control section transmits the current position transmission information when a request from a server is received after the transmission of the current position transmission information.

5. The information communication apparatus according to claim 1, wherein the information concerning the change amount of the current position is a movement direction and a movement distance of the displacement body in a prescribed interval.

6. The information communication apparatus according to claim 1, comprising a current position acquiring section configured to acquire information concerning the current position,
    wherein the transmission control section transmits the change amount transmission information to the outside when the current position acquiring section acquires the information concerning the current position.

7. The information communication apparatus according to claim 5, comprising a change amount sensor configured to detect the information concerning the change amount of the current position,
    wherein the positional change amount acquiring section is configured to calculate the movement direction and the movement distance based on detection data detected by the change amount sensor.

8. The information communication apparatus according to claim 1, wherein the displacement body is an automobile in which the information communication apparatus is mounted.

9. A position management system including an information communication apparatus that is held by a displacement body whose current position changes according to passage of time, the information communication apparatus comprising:
    a positional change amount acquiring section configured to acquire information concerning a change amount of the current position of the displacement body; and
    a transmission control section configured to transmit information to outside of the displacement body,
    wherein the transmission control section is configured to transmit current position transmission information that includes information concerning the current position of the displacement body at a prescribed time to the outside,
    the transmission control section is configured to generate change amount transmission information as information that includes information concerning the change amount of the current position but does not include information concerning the current position, and
    the transmission control section is configured to transmit the change amount transmission information to the outside, at a different timing than transmission of the current position transmission information to the outside,
    wherein the position management system comprises:
    a management apparatus configured to hold information concerning the current position of the displacement body at a prescribed time and receive the change amount transmission information from the information communication apparatus, and
    wherein the management apparatus is configured to calculate the current position of the displacement body after the prescribed time, based on the information concerning the current position of the displacement body at the prescribed time held in the management apparatus and the change amount transmission information.

10. The position management system according to claim 9, wherein the management apparatus is configured to receive the information concerning the current position of the displacement body at the prescribed time from the information communication apparatus.

11. The position management system according to claim 9, wherein the displacement body is usable in a shared manner by a plurality of users, and
    the management apparatus is configured to manage current positions of a plurality of the displacement bodies.

* * * * *